United States Patent [19]

Wurzburg et al.

[11] 4,279,940

[45] Jul. 21, 1981

[54] CLOUDING WITH A STARCH MATERIAL

[75] Inventors: Otto B. Wurzburg, Whitehouse Station; Julianne M. Lenchin, Plainsboro, both of N.J.

[73] Assignee: National Starch and Chemical Corporation, Bridgewater, N.J.

[21] Appl. No.: 117,592

[22] Filed: Feb. 1, 1980

[51] Int. Cl.$^3$ .................. A23L 1/195; A23L 2/00; A23L 2/02
[52] U.S. Cl. .................. 426/590; 426/591; 426/661; 426/592; 426/599
[58] Field of Search .............. 426/590, 15, 11, 661, 426/591, 592, 599, 650

[56] References Cited

U.S. PATENT DOCUMENTS

| | | | |
|---|---|---|---|
| 3,353,961 | 11/1967 | Simon | 426/546 |
| 3,652,291 | 3/1972 | Bedoukian | 426/590 |
| 3,658,552 | 4/1972 | Carlson et al. | 426/590 |
| 3,959,510 | 5/1976 | Felton et al. | 426/590 |
| 4,084,012 | 4/1978 | Krumel et al. | 426/590 |
| 4,093,750 | 6/1978 | Babayan | 426/590 |
| 4,187,326 | 2/1980 | Serafino et al. | 426/590 |

OTHER PUBLICATIONS

Goering, K. J. & Brelsford, D. L., "New Starches", *Cereal Chemistry*, vol. 43, Jan.–Nov. 1966, pp. 127–136.
Woodroof, J. G. & Phillips, G. F., *Beverages: Carbonated and Non-carbonated*, AVI Publishing Co., 1974, pp. 146–152.
O'Dell, J., "Starches for Encapsulation", *Food Processing Industry*, vol. 41, #493, 1972, pp. 36 and 45.
Oppenheimer, A., *Clarifying the Clouding Agent Picture*, Jun. 1974, pp. 60, 62 and 64.
Oppenheimer, A., "Clouding Agents for the Food Industry", *Food Products Development*, vol. 5, #3, 1971, pp. 90–94.
Melillo, D., *Physical Factors Governing the Stabilization of Cloudy Beverages*.

*Primary Examiner*—Joseph M. Golian
*Assistant Examiner*—Elizabeth J. Curtin
*Attorney, Agent, or Firm*—Edwin M. Szala; Margaret B. Kelley

[57] ABSTRACT

Cow cockle starch is used to cloud fluids. It may be added directly to the fluid or, in the case of food and beverage products, to dry powder mixes, flavor concentrates, and/or syrups. When the product contains a non-essential oil flavorant, the starch provides the entire cloud. When the product contains an essential oil flavorant, the starch enhances the cloud.

8 Claims, No Drawings

CLOUDING WITH A STARCH MATERIAL

BACKGROUND OF THE INVENTION

This invention relates to a method for clouding fluids by adding cow cockle starch thereto. It also relates to the blending of cow cockle starch with food and beverage products, such as dry powder mixes, flavor concentrates, and/or syrups to provide or to enhance the cloud in the final product.

It is known and standard practice in the art to provide a cloud in fluids by the formation of oil-in-water or fat-in-water emulsions using edible oils or fats in the case of foods and beverages. These emulsions contain various oils, all of which contribute to the cloud, as well as emulsion stabilizing agents. Typically the oils are citrus and non-citrus essential oil flavorants, clouding oils such as citrus terpene oils and neutral vegetable oils (cottonseed or coconut oil), and weighting or balancing oils such as brominated vegetable oils or Ester gum.

All of these oils, especially the clouding and weighting oils, are subject to oxidation which results in the development of rancid off-flavors in the products and often requires the addition of antioxidants to the products.

Hence, the search has begun for a non-oil-based clouding agent.

Accordingly it is an object of this invention to provide a safe and simple clouding agent which is not oil-based and thus not subject to oxidation.

It is also an object to provide a clouding agent which may be used to enhance the cloud when essential oil flavorants are used without the customary clouding and weighting oils.

It is a further object to provide a clouding agent which will not affect the flavor of the finished product or develop an objectionable off-flavor during storage.

SUMMARY OF THE INVENTION

The above and related objects are achieved by adding cow cockle starch directly to the fluid to be clouded or suspending it in one of the fluids used in the preparation of the final clouded product, such as a flavor concentrate or syrup. Alternatively, the starch may be dry blended with a dry powder mix which is then reconstituted with a fluid to provide a clouded product.

In contrast with the prior art clouding agents, cow cockle starch provides a good cloud without using oils or fats, thus obviating the necessity for emulsion stabilizing agents such as gum arabic, which is expensive and in short supply, and weighting oils such as brominated vegetable oil and/or ester gum, which are subject to oxidation and the development of off-flavors.

DESCRIPTION OF THE PREFERRED EMBODIMENTS

Cow cockle starch is obtained from the seed of the *Saponaria vaccaria* plant, commonly referred to as cow cockle, cow soapwort or cow fat. The starch contains the normal amount of amylose (iodine affinity value of 4.3), as well as the normal amounts of ash, fat and protein. It gelatinizes in the range of 60°-65° C.

As used herein, the term "fluid" is intended to include all liquids which are capable of flow and which may contain particulate solids or gases, either suspended or dissolved. It includes colloidal sols, suspensions, dispersions, and solutions and may even include emulsions in cases where an oil is present.

As used herein the term "clouding agent" is intended to mean a substance capable of imparting a cloud (an opaque appearance) to a fluid, such as the oils or fats in oil-in-water or fat-in-water emulsions or the finely divided particles in sols, dispersions or suspensions.

As used herein, the term "cloud blend" refers to a blend of cow cockle starch, as the clouding agent, with other edible components such as a natural or artificial flavorant, a natural or artificial sweetener, an edible acid, a dry carbonation source, and/or an edible preservative. In the case of dry cloud blends a dry carrier may be used. In the case of liquid cloud blends a liquid carrier will be used unless one of the other components contains sufficient liquid to provide the desired fluidity in the suspension. Other optional components may include encapsulated aromas, fruit pulps, stimulants, and vitamins.

Cow cockle starch is a natural product and, as with other food starches, it is stable, does not affect the flavor of a product, and does not change in flavor during storage.

If used in a liquid system, it is recommended that cow cockle starch be used in combination with a preservative in order to prevent bacterial growth. Any preservative approved for use in foods or beverages is suitable for use with the starch in the cloud blends. The practitioner will recognize that the amount of preservative needed will depend upon the pH of the final product. Typical preservatives include among others sodium benzoate and methyl- or propyl parahydroxy benzoate. If a food or beverage product is not involved, it may be possible to use other preservatives.

As used herein, the term "flavorant" is intended to refer to all natural or artificial flavoring materials normally used in foods or beverages, as well as fruit pulps and flavor extenders. These flavoring materials are normally formulated as water-soluble flavor extracts or water-insoluble essential flavor oil emulsions; however, granulated or powdered flavorants and microencapsulated flavorants are commercially available and would generally be used in dry powder mixes. Liquid formulations typically include alcoholic extracts or essences, aqueous solutions and emulsions, glycerol and propylene glycol solutions, and fruit-juice concentrates. Flavorants of an essential oil character may require extraction with alcohol. The liquid flavorants commonly used in beverages are commercially available in standard concentrations commonly referred to as "2-ounce" or "4-ounce" flavorants, depending on the amount of flavor base which must be added to a gallon of syrup.

As used herein the term "sweetener" refers to natural sugars, such as dextrose, sucrose, maltose and fructose, and to artificial sweetener such as aspartame, certain dipeptides and saccharin. The sweeteners may be used in the dry form or as a syrup which is generally available in a standard concentration. The practitioner will recognize that the amount of sweetener used, if any, will depend on the type of sweetener, type of fluid, and sweetness desired in the finished product.

As used herein, the term "edible acid" refers to the acids used to adjust the pH of the product to the desired range. Suitable acids include citric, phosphoric, lactic, adipic, tartaric, hexamic, fumaric and/or malic.

As used herein, the term "colorant" refers to natural or artificial coloring agents. The term "dry carbonation source" refers to materials which will dissolve in a fluid containing an edible acid and release carbon dioxide. In some cases the acid is present in the carbonation source. Typical materials include sodium, potassium and ammonium carbonates and/or bicarbonates, as well as calcium carbonate which has been co-ground with an edible anhydrous acid or dispersed together with the acid within the matrix of a soluble carbohydrate.

The practitioner will recognize that if a micro-encapsulated cloud blend is to be prepared, it may be necessary to use a carrier such as gum arabic, starches, chemically modified food starches, dextrins, proteins, cellulose esters or ethers, and/or sugars. If an isotonic beverage is desired, it will be necessary to include sodium in the formulation and to adjust the components so as to achieve the required osmolarity in the finished product.

Cow cockle starch may be added directly to the finished fluid which is to be clouded. Alternatively the starch may be added in the form of a dry or liquid cloud blend. Liquid cloud blends should contain a preservative unless they will be used immediately. The fluids to be clouded include water, alcohols and/or juices. The fluids may be flavored, sweetened, carbonated and/or colored, depending upon the type of product desired. The fluids used in the preparation of beverages generally contain additional preservatives and, if a soft drink is being prepared, sufficient edible acid to provide the desired pH in the finished drink.

The starch may be suspended in a flavor concentrate (extract or emulsion) or in a syrup. If a 2-ounce or 4-ounce cloudy flavor concentrate is prepared using the conventional carriers (i.e. water, ethyl alcohol, glycerol and/or propylene glycol) and/or emulsion stabilizing agents, it may be added directly to one gallon of a syrup when sweetened beverages or foods are desired or added to an unsweetened fluid. The syrups used in the preparation of beverages generally contain additional preservatives. Typically one gallon of the syrup is then added to five to six gallons of water (optionally carbonated).

The starch may be dry blended with a dry mix such as beverage powders or flavored or unflavored gelatins. Alternatively, the dry mix may be prepared by suspending the starch in a fluid carrier containing the other desired components and then drying by any method which will not gelatinize the starch, typically spray drying, foam-mat drying or freeze drying. The practitioner will recognize that a dry carbonation source will not be used when the dry cloud blend is to be prepared by drying a fluid carrier which contains an acid.

Typically the starch may be added as a clouding agent to dry beverage powders, carbonated dry beverage powders, alcoholic beverage mixes, syrups, beverage flavor concentrates, bottles and canned soft drinks, carbonated soft drinks, sparkling and still wines, juices, juice concentrates, frozen juices, gelatins, household cleaners, etc.

The practitioner will recognize that the amount of cow cockle starch used will depend upon the degree of clouding desired in the finished fluid as well as the type of flavorant (flavor extract or essential flavor oil) and type of fluid used. It has been found that a light transmittance of 95% or less is usually desired in the clouded fluids. The amount of cow cockle starch is from about 0.001% to 0.3% by weight, based on the fluid.

The following examples will more fully illustrate the embodiments of this invention. In the examples, all parts and percentages are given by weight and all temperatures are in degrees Celsius unless otherwise noted. The transmittance was measured using a Spectronic 20 Spectrophotometer set at 540 nm. The lower the light transmittance, the better the clouding.

EXAMPLE I

This example demonstrates the clouding effect of cow cockle starch at various concentrations. The dry starch was stirred into 100 ml. of water at room temperature. The transmittance readings given in all examples were taken one hour after the stirring ceased. The results are given in Table I.

TABLE I

| Cow Cockle Starch (gram) | Transmittance (%) 540 nm 1 hr. |
|---|---|
| 0.0025 | 87.0 |
| 0.0050 | 79.0 |
| 0.0100 | 66.0 |
| 0.0200 | 50.0 |
| 0.0500 | 35.0 |
| 0.1000 | 23.0 |
| 0.1500 | 13.5 |
| 0.2000 | 3.5 |

The results show that the cloud (opacity) was proportional to the amount of starch used.

EXAMPLE II

This example demonstrates the clouding effect of cow cockle starch at various pH levels. A total of 0.2 gram of starch was stirred into 100 ml. of water at room temperature, and the suspension was adjusted to the desired pH value using the acid or alkali indicated in Table II.

TABLE II

| Water | pH | Transmittance (%) 540 nm 1 hour |
|---|---|---|
| Control | 7.5 | 3.5 |
| Acid | | |
| (adjusted with 0.1 N HCl) | 3.0 | 3.5 |
| (adjusted with Citric Acid) | 4.0 | 3.5 |
| (adjusted with $CO_2$) | 5.5 | 3.5 |
| Alkaline | | |
| (adjusted with 3% NaOH) | 12.0 | 3.5 |

The results show that the transmittance was unaffected by the pH value of the aqueous suspension.

EXAMPLE III

This example compares the clouding effect provided by cow cockle starch with that provided by untreated corn starch, two modified corn starches—Clearjel and Col Flo (trademarks of National Starch and Chemical Corp.), and a commercial beverage cloud blend. A total of 0.2 g. of the various starches and the commercial cloud blend was stirred into 100 ml. of water at room temperature (24° C.). The results are given in Table III.

TABLE III

| Starch | Transmittance (%) 540 nm 1 hr. |
|---|---|
| Cow Cockle | 3.5 |
| Corn (comparative) | 88.5 |
| Col Flo (comparative) | 87.5 |
| Clearjel A (comparative) | 85.5 |
| Commercial Beverage Cloud Blend | 21.0 |

TABLE III-continued

| Starch | Transmittance (%) 540 nm 1 hr. |
|---|---|
| (comparative) | |

The results show that cow cockle starch provided a cloud whereas corn starch and modified food starches did not provide a cloud. It was superior to the commercial beverage cloud blend.

EXAMPLE IV

This example demonstrates the use of cow cockle starch in dry beverage powders, one of which contained a dry carbonation source.

A total of 0.2 g. of starch was dry blended with 13.3 g. of a cloudless reconstitutable orange beverage powder and with 13.3 g. of a cloudless whiskey sour beverage powder containing 0.5 g. of sodium bicarbonate as a dry carbonation source. Their transmittance was compared with a clouded reconstitutable orange beverage powder. The beverage powders were reconstituted by adding 100 ml. of water. The results are given in Table IV.

TABLE IV

| Product | Transmittance (%) 540 nm 1 hour |
|---|---|
| Cloudless Orange Beverage Powder (Control) | 51.0 |
| Cloudless Whiskey Sour Beverage Powder (Control) | 51.5 |
| Orange Beverage Powder + Starch | 3.5 |
| Whiskey Sour Beverage Powder + Starch + Sodium Bicarbonate | 3.5 |
| Orange Beverage Powder Containing a Commercial Cloud Blend | 13.5 |

The results show that the starch provided a good cloud.

EXAMPLE V

This example demonstrates the use of cow cockle starch to enhance the cloud of a beverage prepared from flavor oil emulsion.

An orange flavor emulsion concentrate was prepared by dissolving 10.5 parts of Purity Gum BE (trademark for a modified food starch—National Starch and Chemical Corp.) in 78.56 parts of water containing 0.1 part of sodium benzoate, 0.3 part of citric acid and 0.01 part of FD and C Yellow #6. A total of 10.5 parts of single fold orange oil blend was added under moderate agitation. The mixture was then passed through a two-stage (2500 and 500 Pa) Gaulin homogenizer.

An unflavored syrup was prepared by mixing together 79.39 parts of Nulomoline 11 (trademark for an inverted sugar product—Sucreft Corp.), 16.98 parts of water, 0.48 part of sodium benzoate, 2.42 parts of citric acid, and 0.03 part of FD and C Yellow #6, and 0.7 part of cow cockle starch.

A flavored syrup was prepared by adding 1.66 parts of the flavor concentrate to 98.34 parts of the syrup and mixing thoroughly.

The final orange-flavored beverage was prepared by thoroughly mixing 21.4 parts of the flavored syrup with 295 parts of carbonated water. The finished beverage contained about 0.047% cow cockle starch.

The beverage's transmittance was 1.5% (540 nm) after 1 hour compared with 38.0% for a control beverage prepared without the cow cockle starch.

The results show that the starch greatly enhanced the cloud.

EXAMPLE VI

This example demonstrates the use of cow cockle starch to provide the cloud in a beverage prepared from a flavor extract.

A flavored syrup was prepared by dissolving 2 parts of an orange flavor extract in 98 parts of a syrup prepared by mixing together 79.39 parts of Nulomoline 11, 15.68 parts of water, 0.48 part of sodium benzoate, 2.42 parts of citric acid, 0.03 part of FD and C Yellow #6, and 1.5 parts of cow cockle starch.

The final orange-flavored beverage was prepared by thoroughly mixing 21.4 parts of the flavored syrup with 295 parts of carbonated water. The finished beverage contained about 0.1% cow cockle starch.

The beverage's transmittance was 1.0% (540 nm) after 1 hour compared with 74.5% for a control beverage prepared without cow cockle starch.

The results show that the starch provided a good cloud.

EXAMPLE VII

This example demonstrates the use of cow cockle starch in a gelatin product.

A total of 0.2 g. starch was dry blended with 13.3 g. of orange gelatin and 100 ml. of water were added. The product's transmittance was 3.5% (540 nm) after 1 hour.

EXAMPLE VIII

This example demonstrates the use of cow cockle starch in a frozen juice product.

A total of 0.1 g. starch was suspended in 100 ml. of orange juice and the mixture was frozen. The juice's transmittance was 2.5% (540 nm) after 1 hour.

EXAMPLE IX

This example demonstrates that cow cockle starch does not affect the flavor of beverages prepared from dry beverage powders (prepared as in Example IV). A panel of six people tasted the beverages and confirmed that they tasted no different than the beverages prepared from a clouded, reconstitutable orange beverage powder and an unclouded whiskey sour mix. Thus, cow cockle starch will not adversely affect the flavor of beverage and food products.

EXAMPLE X

This example demonstrates that cow cockle starch may be used as a clouding agent in a household cleanser.

A total of 0.2 g. of starch was added to 100 ml. of clear household ammonia. The resulting cloudy ammonia had a transmittance of 2.5% at 540 nm.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specification.

We claim:

1. An improved method for clouding edible fluids, wherein the improvement comprises adding cow cockle starch, as a fat- and oil-free agent, in an amount from about 0.001% to 0.3% by weight, based on said fluid, said amount being sufficient to provide a light transmittance of 95% or less in said fluid at 540 nm, and a preservative, whereby said fluid is storage-stable.

2. The method of claim 1, wherein said fluid is selected from the group consisting of water, alcohol, juice and mixtures thereof and wherein said fluid is still or carbonated.

3. An improved clouded, flavored dry beverage powder, suitable for reconstitution into a clouded liquid beverage, which comprises a flavorant, a sweetener, an edible acid, and optionally a colorant, wherein the improvement comprises the presence of a cow cockle starch as a dry, fat- and oil-free clouding agent, in an amount from about 0.001% to 0.3% by weight, based on the reconstituted liquid beverage, said amount being sufficient to provide a light transmittance of 95% or less in said liquid beverage at 540 nm, whereby said total dry beverage powder is storage-stable.

4. The dry beverage powder of claim 3, wherein said flavorant is an essential oil flavorant.

5. The dry beverage powder of claim 3, wherein said flavorant is a non-essential oil flavorant.

6. An improved clouded beverage which comprises a fluid, a preservative, a flavorant, a sweetener, and optionally an edible acid and a colorant, wherein the improvement comprises the presence of a cow cockle starch as a fat- and oil-free clouding agent, in an amount from about 0.001% to 0.3% by weight, based on said beverage, said amount being sufficient to provide a light transmittance of 95% or less in said clouded beverage at 540 nm, whereby said beverage is storage-stable.

7. The clouded beverage of claim 6, wherein said flavorant is an essential oil flavorant.

8. The clouded beverage of claim 6, wherein said flavorant is a non-essential oil flavorant.

* * * * *